United States Patent [19]
Tabuchi

[11] Patent Number: 5,126,875
[45] Date of Patent: Jun. 30, 1992

[54] SEMICONDUCTOR OPTICAL DEVICE HAVING A VARIABLE REFRACTIVE INDEX PROFILE

[75] Inventor: Haruhiko Tabuchi, Sagamihara, Japan

[73] Assignee: Fujitsu Limited, Kawasaki, Japan

[21] Appl. No.: 715,715

[22] Filed: Jun. 18, 1991

Related U.S. Application Data

[63] Continuation of Ser. No. 554,558, Jul. 19, 1990, abandoned.

[30] Foreign Application Priority Data

Jul. 19, 1989 [JP] Japan .................................. 1-184782

[51] Int. Cl.⁵ .................... H01L 29/165; H01L 27/14; G02F 1/01
[52] U.S. Cl. ..................... 359/319; 359/245; 359/248; 357/16; 357/30
[58] Field of Search .................... 357/30, 16; 350/355; 359/319, 248, 245

[56] References Cited

U.S. PATENT DOCUMENTS

| | | | |
|---|---|---|---|
| 3,790,853 | 2/1974 | Pankove | 317/235 |
| 3,894,792 | 7/1975 | Komatsubara et al. | 350/160 |
| 4,525,687 | 6/1985 | Chemla et al. | 350/355 |
| 4,528,418 | 7/1985 | McGill | 357/30 |

FOREIGN PATENT DOCUMENTS

| | | | |
|---|---|---|---|
| 59-22010 | 2/1984 | Japan | 350/355 |
| 61-32582 | 2/1986 | Japan | 357/30 |
| 105117 | 5/1987 | Japan | 357/16 |
| WO84/02782 | 7/1984 | PCT Int'l Appl. | |

OTHER PUBLICATIONS

Pankove, RCA TN No. 721, Jun. 1967, "Optical Beam Deflector".
Taylor et al., J. Appl. Phys., vol. 59, No. 2, 15 Jan. 1986 pp. 596-600, "A New Double in Epitaxy".
Soviet Inventions Illustrated, Derwent Publications Ltd., Section Electrical Week B17, Abstract No. D7823, B17, Jun. 8, 1979 & SU-A-61167 (Yashin E.M.) May 15, 1978 *the whole document*.
Patent Abstract of Japan, vol. 8, No. 242 (P-311) (1679) Nov. 7, 1984 & JP-A-59 116 612 (Toshiba) Jul. 5, 1984, *the whole document*.

Primary Examiner—Jerome Jackson, Jr.
Attorney, Agent, or Firm—Staas & Halsey

[57] ABSTRACT

A semiconductor optical device for focusing an optical beam includes a substrate doped to a first conductivity type, a semiconductor layer doped to a conductivity type different from that of the substrate, a recombination region formed between the substrate and the second semiconductor layer, a first electrode provided on a bottom surface of the substrate, and a second electrode provided on a top surface of the second semiconductor layer. The first electrode is transparent to the optical beam which passes freely therethrough. The second electrode is provided with a passage for the optical beam. The passage has a size which exceeds the carrier diffusion length in the semiconductor layer. A profile of refractive index is thus created in the recombination region such that the refractive index is at a minimum at the center of the circular passage and is at a maximum at an edge of the passage.

13 Claims, 10 Drawing Sheets

PRIOR ART

FIG. 1

PRIOR ART

FIG. 2

FIG. 3A $D' \geq D$

SEMICONDUCTOR OPTICAL DEVICE HAVING A VARIABLE REFRACTIVE INDEX PROFILE

This application is a continuation of application Ser. No. 554,558, filed Jul. 19, 1990, now abandoned.

BACKGROUND OF THE INVENTION

1. Field of the Invention

The present invention generally relates to semiconductor devices and in particular to a semiconductor optical device having a variable refractive index profile.

Figure 1:
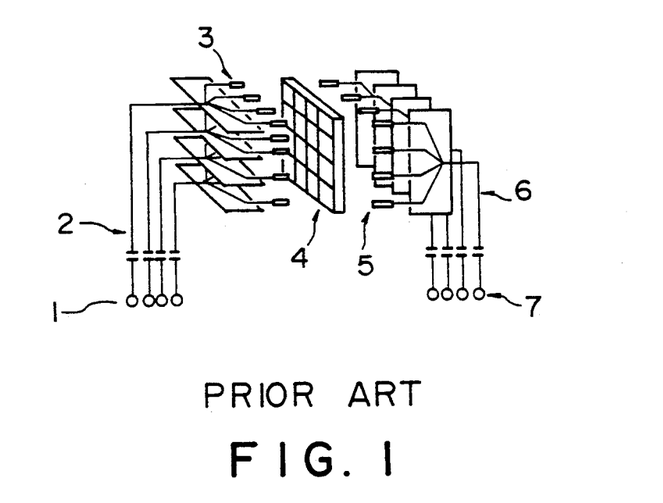
FIG. 1 is a schematical view showing a prior art optical telecommunication system in which the present invention may be employed.

With the development of optical telecommunications systems using optical fibers as a means for transmitting information, the need for various high speed optical switching devices is becoming an acute problem. For example, the concept of an optical switching system as shown in FIG. 1 has been proposed, wherein light beams produced by a semiconductor laser array 1 are guided along optical fibers 2 each having branched ends on which optical couplers 3 are provided, and these optical couplers 3 are coupled respectively with corresponding optical couplers 5 via an optical gate array 4. Each of the optical couplers 5 is connected to an optical fiber, and the optical fibers are assembled into a reduced number of optical fibers 6 which in turn are connected to a photodetector array 7. The optical gate array 4 selectively allows the passage of the optical beam from the optical coupler 3 to the corresponding optical coupling element 5, and thus optical switching within the telecommunication network is achieved.

In such an optical gate array, the use of a semiconductor material wherein the transmittance of light changes in response to the carrier density therein has been considered for switching the optical beam. The transmittance in such a semiconductor material is reduced in response to injection of carriers and is increased in response to a depletion of the carriers therein. However, such a semiconductor material may lose the capability of switching the optical beam when subjected to a light having a large intensity, since strong light increases the transmittance unconditionally.

Figure 2:
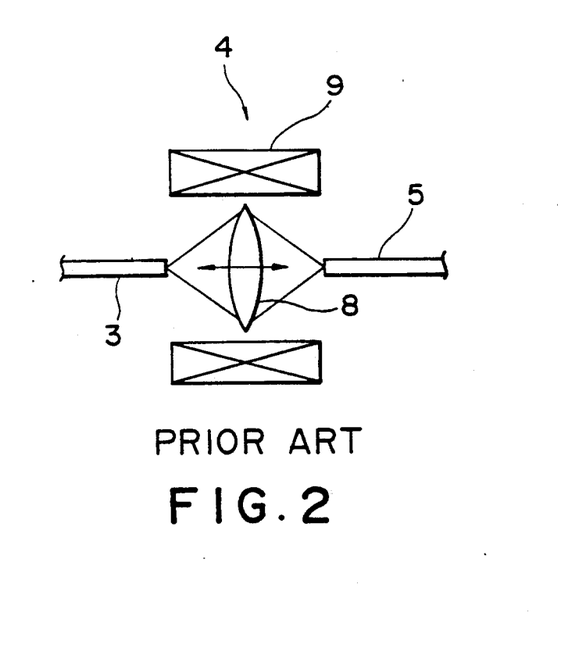
FIG. 2 is an optical element used conventionally in optical disk players and which could be used in connection with the system of FIG. 1.

In order to avoid the foregoing problem, the use of a movable lens system as shown in FIG. 2 has been considered. Such a movable lens system is used commonly in conventional optical disk recording systems such as compact disk players and comprises a lens 8 held movably on a magnetic or piezoelectric actuator device 9. When using this system in connection with a gate array 4, the lens 8 and the actuator 9 are disposed in a row and column formation in correspondence to the optical couplers 3 and 5, and optical switching occurs in response to the movement of the lens 8. Thus, when the lens 8 is in a focusing state with respect to the optical couplers 3 and 5 as shown in FIG. 2, the optical beam in the coupler 3 is transferred to the optical coupler 5. On the other hand, when the lens 8 is offset in either direction relative to the optical coupler 3 or to the optical coupler 5, the transfer of the optical beam is interrupted.

Such a system, although capable of operating properly even when subjected to a strong light, has an obvious problem in that it relies upon mechanical movement of the lens 8 for the optical switching and thus has a problem of slow response due to the mechanical inertia of the lens 8. Thus, the use of such mechanical system for optical gate array systems of optical telecommunication systems or for future optical computers is out of the question.

An optical device which is capable of changing the focal length of the lens or capable of deflecting an optical beam in response to a control signal at a high speed is demanded. Such an optical device would be useful also in other optical systems such as in compact disk players or laser printers wherein the laser beam must be focused on a rotary body rotating at a high speed while maintaining a proper focusing state.

SUMMARY OF THE INVENTION

Accordingly, it is a general object of the present invention to provide a novel and useful semiconductor optical device wherein the foregoing problems are eliminated.

Another object of the present invention is to provide a semiconductor optical device capable of deflecting an optical beam passing therethrough in response to a control electric signal.

Another object of the present invention is to provide an optical element for focusing an optical beam passing therethrough with a simple construction.

Another object of the present invention is to provide a semiconductor optical device for variably focusing an optical beam passing therethrough at different focal lengths, wherein the focal length can be changed in response to an electrical control signal at a high speed.

Another object of the present invention is to provide a semiconductor optical device for variably focusing an optical beam passing therethrough at different focal lengths, wherein the extent of change in the focal length is increased.

Another object of the present invention is to provide a semiconductor optical device for variably focusing an optical beam incident thereto and passing therethrough at different focal lengths by inducing a variable refractive index distribution in a semiconductor layer, wherein formation of optical noise in response to recombination of carriers is eliminated.

Another object of the present invention is to provide a semiconductor optical device for variably focusing an optical beam incident thereto and passing therethrough along an optical axis with excellent axial symmetry.

Another object of the present invention is to provide a semiconductor optical device for variably focusing an optical beam incident thereto and passing therethrough at different focal lengths, comprising a substrate doped to a first conductivity type and which is transparent to an incident optical beam supplied to the semiconductor optical device, a semiconductor layer doped to a second conductivity type and which is provided on the substrate, said semiconductor layer being transparent to the incident optical beam, a recombination region which is formed between the substrate and the semiconductor layer and which is supplied with carriers from the substrate and the semiconductor layer for causing a recombination of the carriers to occur within the region, first electrode means provided on a bottom surface of the substrate for injecting carriers into the substrate, and second electrode means provided on a top surface of the second semiconductor layer for injecting carriers into the semiconductor layer, wherein the first electrode means is transparent to the optical beam and capable of allowing the optical beam to freely pass therethrough, said second electrode means being provided with a circular passage for the optical beam with a diameter which exceeds the carrier diffusion length in the semiconductor layer, so that a profile of refractive index is produced in the recombination region such that the refractive index is at a minimum at the center of the circular passage and is at a maximum at the rim of the circular passage. According to the present invention, a symmetrical distribution of the carriers is obtained in the recombination region in response to the injection of carriers through the first and second electrodes under a forward biasing state. Thus, the distribution of the carriers changes exponentially from the rim of the opening to the center thereof because the diameter of the opening in the second electrode exceeds the carrier diffusion length so that the carrier density is high at the rim and low at the center of the opening. In response to the exponential distribution of the carriers, a distribution of the refractive index having a corresponding exponential profile is produced in the recombination region, and such an exponential distribution profile of the refractive index provides a convergent wavefront in the incident optical beam similar to that provided by a convex lens. In other words, the semiconductor optical device of the present invention works as a convex lens. It should be noted that the exponential distribution of the refractive index closely approximates a parabolic distribution of the refractive index. By changing the carrier injection conditions, the focal point may be moved significantly from infinity to a few millimeters. Carriers are not concentrated in the present structure because of the absence of a mesa structure which is used commonly in laser diodes for laterally confining the carriers in the recombination region. Accordingly, the carrier density is much smaller than in the case of laser diodes and the emission of unwanted light due to the recombination of carriers is minimized. Further, by selecting the composition of the material from which the recombination region is formed such that the wavelength of light produced by recombination is shorter than the wavelength of the optical beam incident to the semiconductor optical device, a decrease in the S/N ratio in the optical beam due to the noise caused by the light produced during recombination can be avoided.

Another object of the present invention is to provide a semiconductor optical device for variably focusing an optical beam incident thereto and passing therethrough at different focal lengths, comprising a substrate, a multiple quantum well structure provided on the substrate, an insulating cap layer further provided thereon, first electrode means provided on a bottom surface of the substrate for applying an electric field to the substrate, and second electrode means provided on a top surface of the insulating cap layer for applying an electric field in cooperation with the first electrode means, wherein the first electrode means is transparent to the optical beam and capable of allowing the optical beam to freely pass therethrough and said second electrode means is provided with a circular passage for the optical beam having a diameter which exceeds the carrier diffusion length in the semiconductor layer, so that a profile is produced in the electrical field in the multiple quantum well structure such that a refractive index profile appears in the multiple quantum well structure with a minimum refraction index at the center of the circular passage and a maximum refraction index at the rim of the circular passage. According to the present invention, the optical beam is focused at a predetermined focal point in a manner which is similar to the way a convex lens focuses a beam, and the focal point can be changed from infinity to less than 1 mm in response to the effects of an electric field applied across the first and second electrode means. Further, the formation of unwanted optical radiation in response to the combination of the carriers is entirely eliminated in the foregoing construction.

Other objects and further features of the present invention will become apparent from the following detailed description when read in conjunction with attached drawings.

DETAILED DESCRIPTION

A first embodiment of the present invention is described hereinbelow with reference to FIGS. 3A-3C.

Figure 3A:
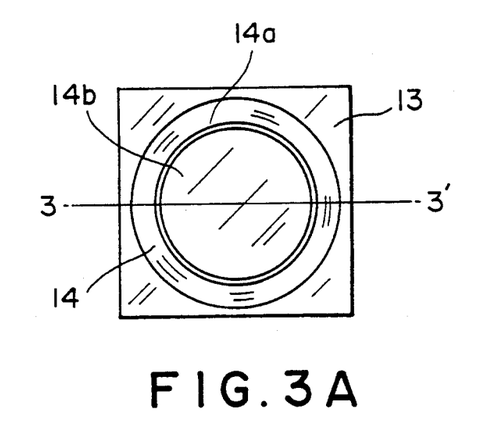
FIGS. 3A-3C are respectively a plan view, an elevational cross-sectional view and a bottom view of a semiconductor optical device according to a first embodiment of the present invention.
Figure 3B:
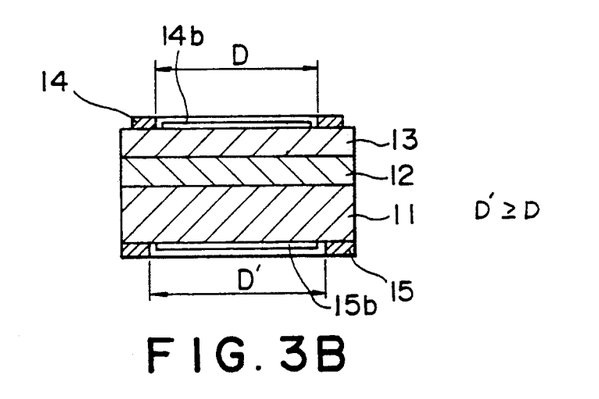

FIG. 3B is a cross-sectional view of a first embodiment of a semiconductor device of the present invention. As can be seen in FIG. 3B, the device comprises a semiconductor substrate 11 of indium phosphide (InP) having a thickness of about 100 $\mu$m and which is doped to the n-type with a carrier density of $1 \times 10^{18}$cm$^{-3}$, an n-type semiconductor layer 12 of the indium gallium arsenide phosphide (InGaAsP) which has been grown on the substrate 11 to a thickness of 2 $\mu$m and which has a carrier density of $5 \times 10^{17}$cm$^{-3}$, and a p-type semiconductor layer 13 of InP which has been grown on the semiconductor layer 12 to a thickness of 2 $\mu$m and which has a carrier density of $1 \times 10^{18}$cm$^{-3}$. The substrate 11 and the layer 13 have a band gap of 1.27 eV while the layer 12 has a band gap of 1.17 eV. Thus, a double-hetero structure is formed wherein a layer of small band gap is sandwiched between layers of larger band gap. Thereby, carriers are effectively confined in layer 12.

A ring shaped electrode 14 of gold is provided on the top surface of layer 13 as shown in the plan view of FIG. 3A to present a circular opening or window 14a through which the top surface of the semiconductor layer 13 is exposed. The window 14a has a diameter D which is preselected so as to be larger than the diffusion length of the carriers in layers 12 and 13 which have been injected through the electrode 14. In the present embodiment which includes the n-type InP substrate 11, the diameter D is chosen to be 40 μm so as to be sufficiently larger than the diffusion length of holes in InP which is about 10 μm. Further, the surface of semiconductor layer 13 which is exposed through window 14a is covered by an anti-reflection film 14b of silicon nitride with a thickness of about 2000 Å as shown in the cross-sectional view of FIG. 3B.

Figure 3C:
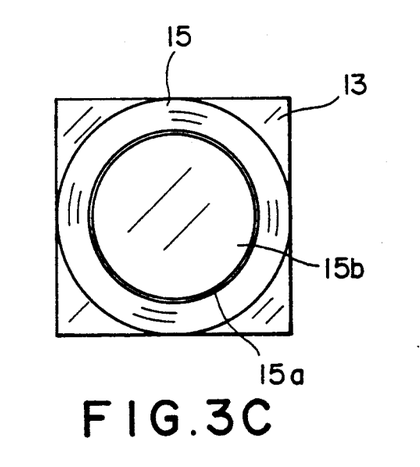

FIG. 3C is a bottom view of the semiconductor device of FIGS. 3A and 3B. As can be seen in FIG. 3C, a ring shaped electrode 15 of gold is provided at the bottom surface of the substrate 11. Electrode 15 has a circular opening or window 15a therein which is disposed in general alignment with window 14a. The bottom surface of substrate 11 is exposed through window 15a which has a diameter D' that is chosen to be equal to or larger than the diameter D. The portion of the bottom surface of substrate 11 which is exposed through window 15a is covered by an anti-reflection film 15b as can be seen in the cross-sectional view of FIG. 3B.

In operation, top electrode 14 is connected to a positive voltage source and bottom electrode 15 is connected to a negative voltage source so that a forward bias is applied to the semiconductor device. In response to the forward bias, electrons are injected from ring-shaped electrode 15 at the bottom of substrate 11 and the electrons thus injected diffuse into semiconductor layer 12 through the substrate 11. On the other hand, holes are injected from ring-shaped electrode 14 at the top of layer 13 and the holes thus injected diffuse into the layer 12 through layer 13. The injected holes generally maintain the ring-shaped pattern of electrode 14 because the diameter D thereof exceeds the diffusion length of holes in layer 13.

Once the carriers have reached the semiconductor layer 12 at the center of the double-hetero structure, further diffusion of the carriers beyond layer 12 is prohibited and the carriers diffuse laterally toward the central part of the layer 12 which coincides with the centers of the circular windows 14a and 15a. During such lateral diffusion the carriers recombine and the carrier density is thus decreased so as to form the lateral carrier density profile N(X) represented by the following expression:

$$N(X)=A[EXP((-X-R)/L)+EXP((X-R)/L)],$$

wherein X is the from the rim of the electrode 14a, A is a constant, R is the radius of the circular window 14a, and L is the diffusion length of holes in the semiconductor layer 12.

Figure 4:
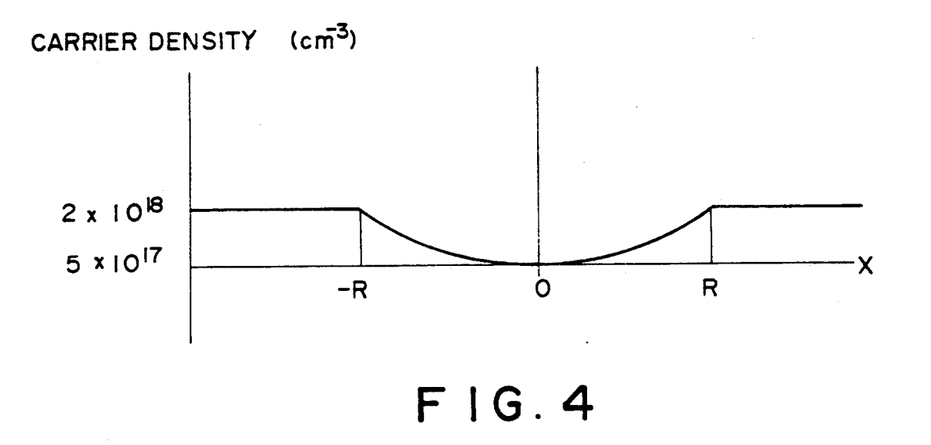
FIG. 4 is a carrier density distribution profile formed in a semiconductor optical device of the embodiment of FIG. 3.

FIG. 4 shows the distribution of holes in layer 12 obtained in response to the injection of holes and electrons through electrodes 14 and 15 at a current density of 10 kA/cm$^{-2}$. This current density is obtained by supplying an overall current of about 40 mA in the case where the openings D and D' each have a diameter of 40 μm.

Figure 5:
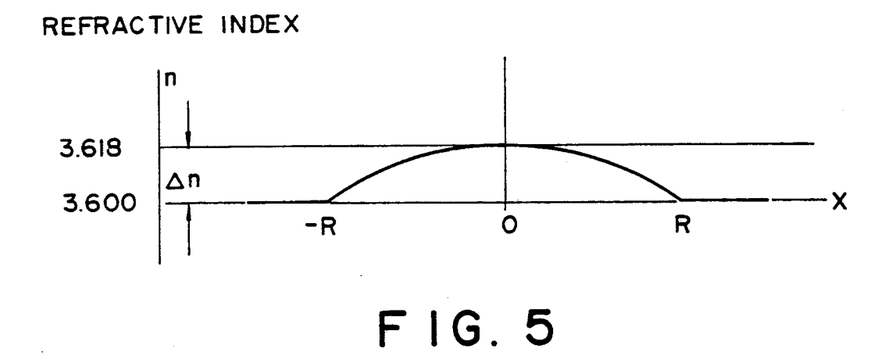
FIG. 5 is a refractive index distribution profile formed in a semiconductor optical device of the embodiment of FIG. 3 in correspondence to the carrier density profile of FIG. 4.
Figure 6:
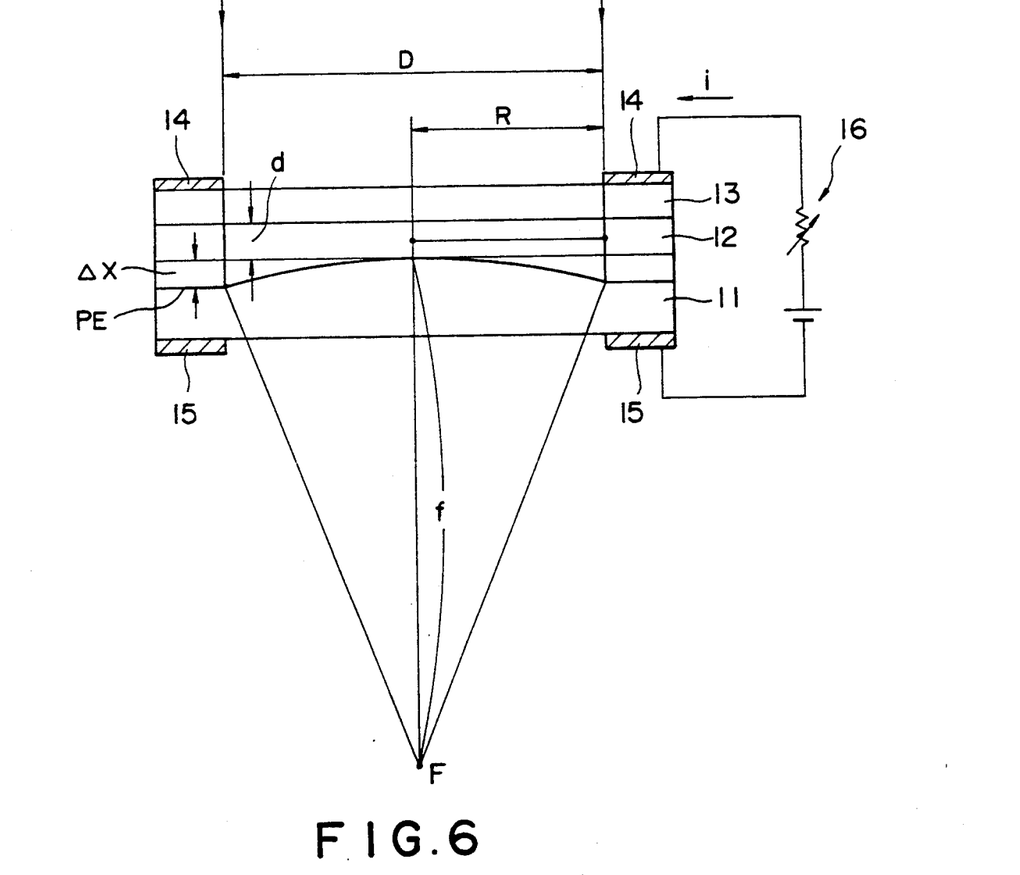
FIG. 6 is a cross-sectional view of the semiconductor optical device of the embodiment of FIG. 3 showing that the focusing action of the device is similar to that of a convex lens.

In response to the injection of carriers, a hole density of about $2\times10^{18}$cm$^{-3}$ is established in layer 12 immediately beneath electrode 14 including at the rim of opening 14a thereof. The hole density then decreases exponentially in a direction toward the center of opening 14a in accordance with the equation set forth above so that a minimum hole density of about $5\times10^{17}$cm$^{-3}$ is established at the center. As a result of the hole density profile, a corresponding refractive index profile as shown in FIG. 5 is obtained providing a maximum refractive index of about 3.618 at the center of the opening 14a and a minimum refractive index of about 3.600 at the rim of the opening 14a. This refractive index has an exponential profile corresponding to the exponential profile of FIG. 4 and the semiconductor device thus operates as a convex lens. It should be noted that the exponential profile of the refractive index closely approximates a parabolic profile to establish a focal point F as shown in FIG. 6 at a focal length f of about 2 mm. It should be noted that FIG. 6 illustrates a spherical wavefront PE induced in the optical beam passing through layer 12 in response to the forward bias provided by a biasing circuit 16. As shown in FIG. 6, the wavefront of the optical beam is advanced at the rim part of opening 14a by the amount ΔX in which the term ΔX is determined by the relationship ΔX=n·Δn·d, where n is the refractive index at the center of layer 12, d is the thickness of layer 12, and Δn represents the decrement of the refractive index at the rim as defined in FIG. 5.

When there has been no carrier injection into layer 12, on the other hand, the carrier distribution profile in layer 12 is flat and has a value of about $5\times10^{17}$cm$^{-3}$, which corresponds to the carrier density at the center of opening 14a. In other words, the carrier density at the center of opening 14a does not change substantially in response to the injection of carriers. Since the wavefront of the optical beam is flat, the optical beam passing through the semiconductor device is focused at an infinite distance. In other words, the semiconductor optical device of the present invention operates as a lens which can change the focal length from infinity to about 2 mm in response to carrier injection.

Figure 7:
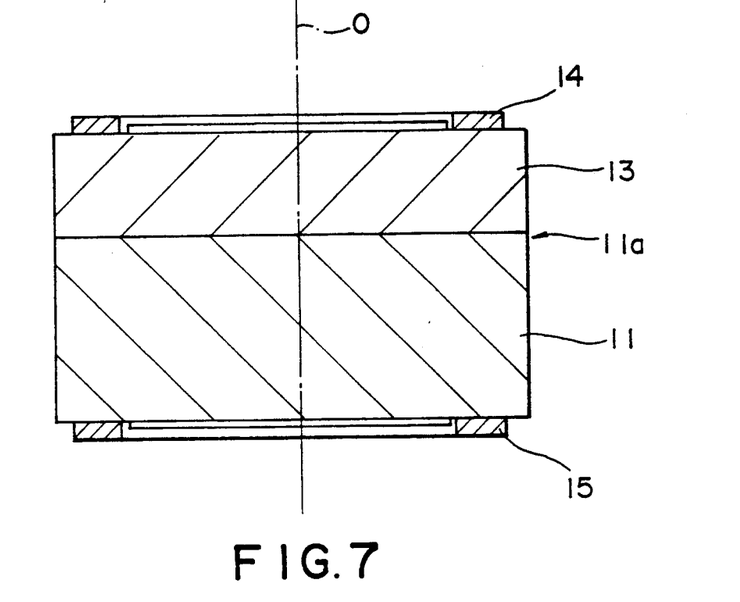
FIG. 7 is a cross-sectional view showing a modification of the embodiment of FIG. 3.

It should be noted that the semiconductor optical device of the present embodiment is not limited to one having an n-type layer 12 in the double-hetero structure but may instead utilize a p-type layer or an undoped layer as layer 12, with substantially the same result. It should be noted that the double-hetero structure used in the semiconductor optical device of the present embodiment is not essential for the operation of the device and may be eliminated as shown in FIG. 7. In this case, layer 12 is eliminated and a p-n junction 11a is established at the interface between substrate 11 and layer 13. The recombination of electrons and holes occurs in correspondence to the p-n junction 11a and profiles of carrier density and refractive index similar to those shown in FIGS. 4 and 5 are created at the p-n junction 11a.

In the foregoing so-called current injection type device, one may anticipate the possibility that optical radiation may occur in the semiconductor device due to the recombination of the carriers. However, the effect of such optical radiation can be minimized by employing a structure wherein the mesa structure which is commonly used in laser diodes for concentrating carriers in a limited action region of the device is eliminated.

Further, by selecting the wavelength of the optical beam to be focused by the semiconductor optical device at a value which does not cause interaction with the material from which the layer 12 is formed, such superfluous optical radiation can be minimized. For example, semiconductor layer 12, having a band gap of 1.17 eV, produces optical radiation at a wavelength of 1.45 μm which does not interact with an optical beam having a wavelength of 1.5 μm which is commonly used for optical telecommunication through optical fibers. When the wavelength of the optical beam is specified, on the other hand, one can avoid the problem of superfluous optical radiation by simply choosing a composition for layer 12 such that the band gap thereof provides radiation at a wavelength which is smaller than the wavelength of the optical beam to be used. Thus, the optical radiation formed in the device by the recombination of the carriers does not provide any serious effects on the performance of the device. The semiconductor device has excellent transparency with respect to an optical beam having a wavelength of 1.5 μm.

It should be noted that the present device, as shown in FIGS. 3A–3C or in FIG. 7, has a structural feature which distinguishes the semiconductor device from a typical photodiode. That is to say, the electrode 15 at the bottom of substrate 11 is configured to allow passage of the optical beam and there is no optical absorption region formed therein. As the optical beam passes through the device freely, the device does not operate as a photodetecting device.

In a second embodiment of the present invention, as shown in FIGS. 8A–8D, the problem of the formation of the optical radiation in the device is entirely eliminated.

Figure 8A:
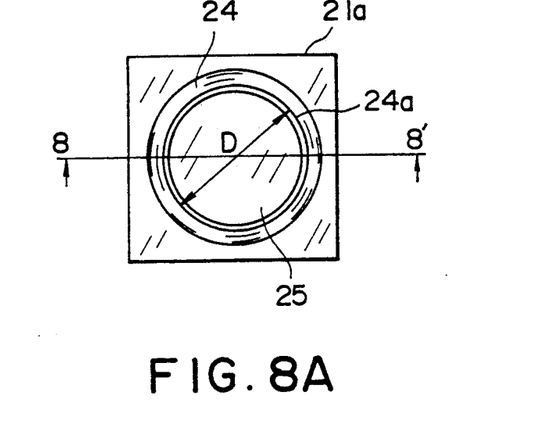
FIGS. 8A-8D are diagrams showing a second embodiment of the present invention.
Figure 8B:
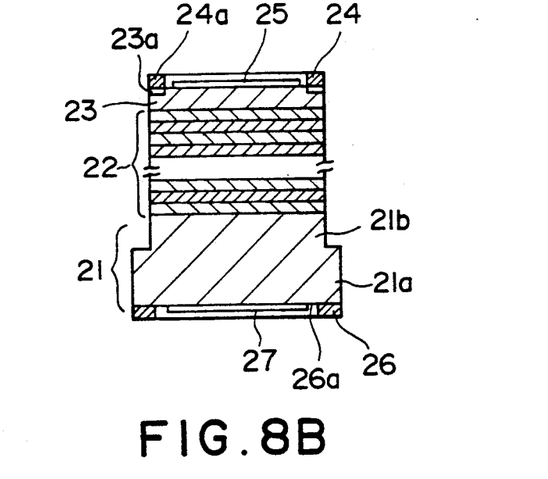
Figure 8C:
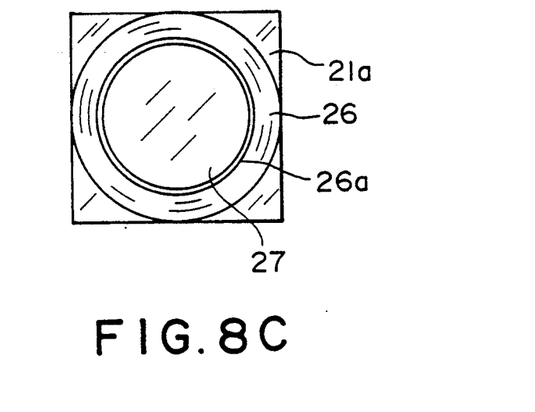
Figure 8D:
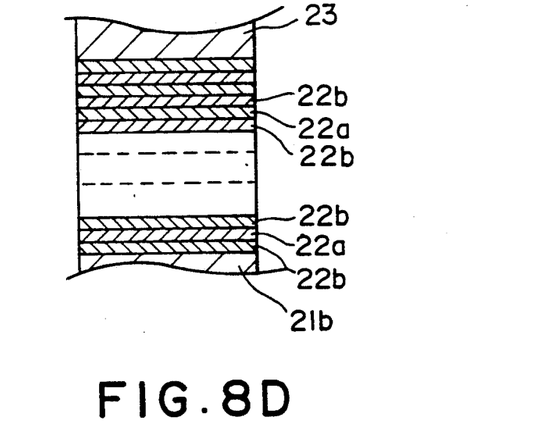

FIGS. 8A–8C show the second embodiment respectively in plan view, an elevational cross-sectional view and in a bottom view, and FIG. 8D shows a part of the structure of FIG. 8B in an enlarged scale.

With reference to FIGS. 8A and 8B, the semiconductor optical device includes a substrate 21 of n-type InP doped to an impurity density of $1 \times 10^{18}$ cm$^{-3}$ or more. Substrate 21 is made of a base part 21a having a rectangular shape in the plan view and a cylindrical part 21b is formed on the base part 21a. A cylindrical multiquantum well (MQW) structure 22 to be described later is provided on cylindrical part 21b in conformity with the shape of cylindrical part 21b and with a thickness of about 1 μm. A cap layer 23 of undoped InP also having a cylindrical form is provided on the MQW structure 22 also in conformity with the shape of MQW structure 22 and with a thickness of about 4 μm. The overall height of the substrate 21, the MQW structure 22 and the cap layer 23 is 10 μm. A ring-shaped electrode 24 of gold is provided on the top surface of MQW structure 22 in correspondence to the outer rim of cap layer 23. Ring-shaped electrode 24 has a circular opening 24a with a diameter of 20 μm and the top surface of cap layer 23 is exposed through opening 24a. Further, an anti-reflection film 25 of silicon nitride is deposited on the exposed top surface of cap layer 23 to a thickness of about 2000 Å diffusion region 23a is provided in layer 23 immediately below the ring-shaped electrode 24 wherein cap layer 23 is doped to the p-type with an impurity density of $2 \times 10^{18}$ cm$^{-3}$. The region 23a may be formed by diffusing zinc into layer 23.

Referring now to the bottom view shown in FIG. 8C, another ring-shaped electrode 26 of gold is provided on the top of base part 21a of substrate 21. Electrode 26 has a circular opening 26a which is disposed in general alignment with the corresponding circular opening 24a of electrode 24. The diameter of opening 26a may be sufficiently large so that an optical beam passing into the device through the opening 24a is able to exit through opening 26a without being obstructed. In the illustrated example, the diameter of opening 26a is set at 24 μm. It should be noted that the semiconductor device is transparent to an optical beam having a wavelength of about 1.5 μm. In order to facilitate the free passage of the optical beam through the device, another anti-reflection film 27 of silicon nitride is provided on the portion of substrate 21 which is exposed by opening 26a with a thickness of 2000 Å. The optical beam is therefore able to pass through the device with reduced absorption.

FIG. 8D shows the structure of the MQW structure 22 in detail. As can be seen in the drawing, the structure 22 is formed from alternately stacked thin layers 22a and 22b. The layer 22a is formed from indium gallium arsenide phosphide (InGaAsP) with a thickness of 200 Å and the layer 22b is formed from indium phosphide (InGaP) with a thickness of 200 Å. Each layer 22a is thus sandwiched by a pair of layers 22b. As InGaP has a energy gap which is substantially larger than that of InGaAsP, the layers 22b act as carrier confinement layers and a quantum well is formed in each layer 22a because of the reduced thickness of the layers 22a. As is well known, a number of discrete quantum levels appear in the quantum well structure.

Figure 9A:
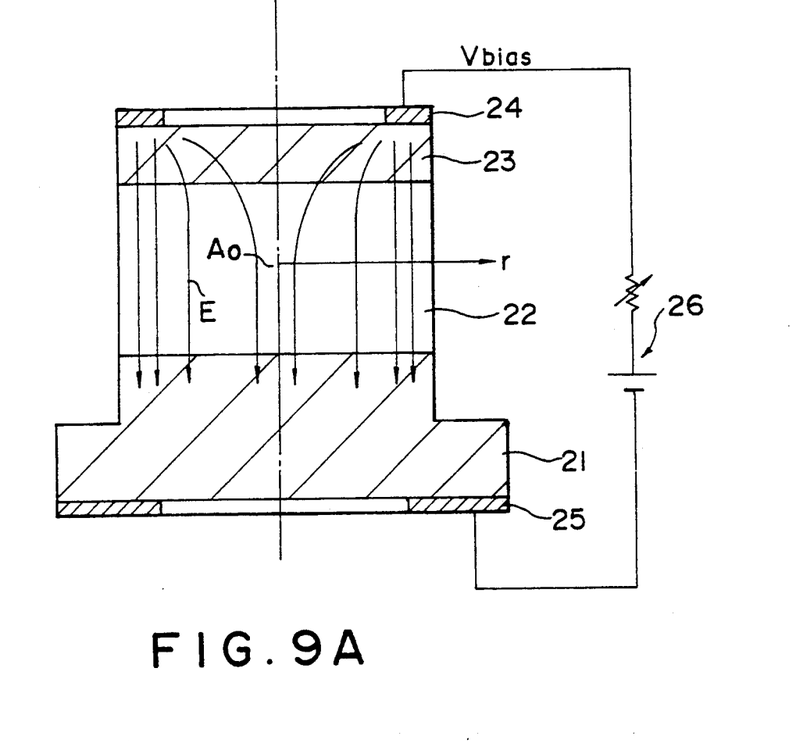
FIGS. 9A and 9B are diagrams showing the principles of the present invention.

In operation, a bias voltage is applied across the electrodes 24 and 25 by a biasing circuit 26 as shown in FIG. 9A. In FIG. 9A, only essential parts needed for explanation are illustrated.

In response to the application of the bias voltage Vbias to electrode 24, an electric field E is established in the device, particularly in MQW layer 22 as schematically illustrated in FIG. 9A.

Figure 9B:
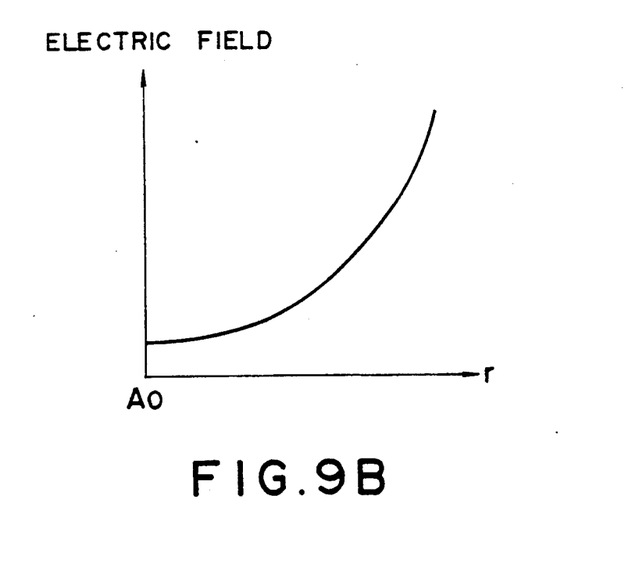

As can be seen in FIG. 9A, the lines of electric force extend straight from the electrode 24 to the substrate 21 in the region immediately beneath electrode 24. It should be noted that the electric potential is constant throughout substrate 21 because of the high conductivity realized therein as a result of doping. With increasing separation or distance from the rim of opening 24a toward the center structure 22, the density of the lines of electric force decreases generally parabolically as shown in FIG. 9B, wherein the origin of FIG. 9B is chosen so as to be located at the center Ao of MQW structure 22. When viewed from center Ao, the electric field increases parabolically toward the outer rim of cylindrical MQW structure 22.

Figure 10:
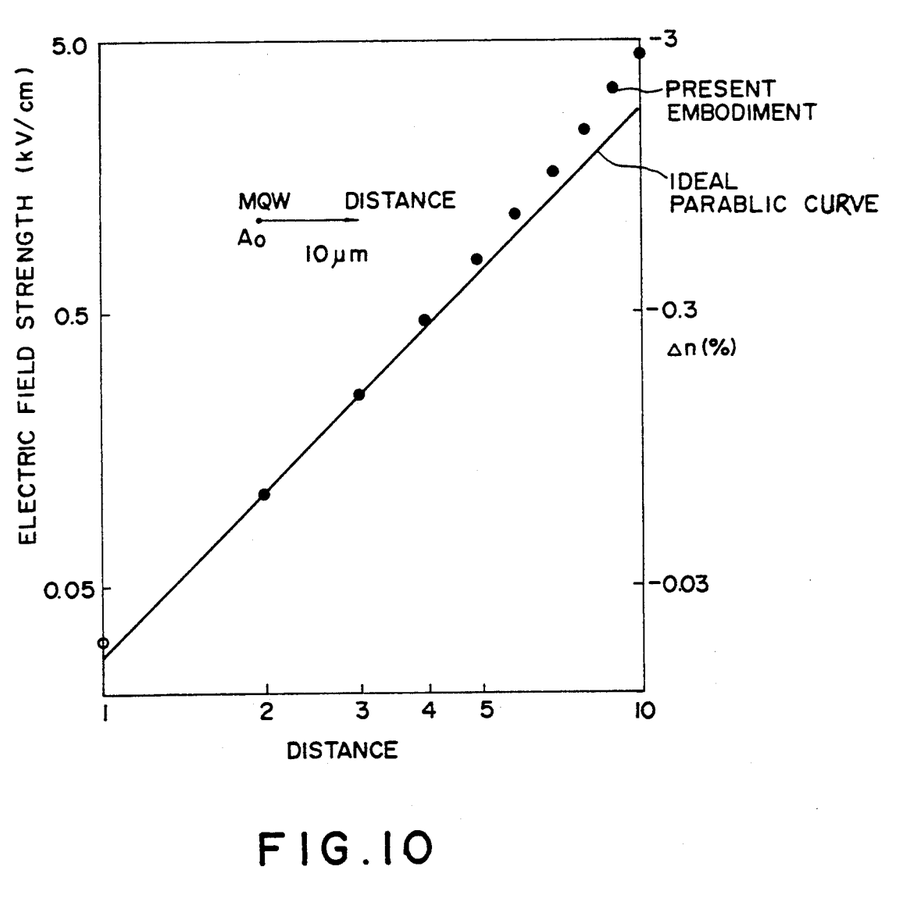
FIG. 10 is a diagram showing an electrical field strength profile induced in the device of the embodiment of FIGS. 8A-8D.

FIG. 10 shows the distribution of the electric field strength appearing in MQW structure 22 in detail. In this drawing, the abscissa is plotted as the square of the distance from center Ao in the radial direction of structure 22. Thus, the straight line in the drawings represents an ideal parabolic profile of the electric field strength. As can be seen from the solid circle representing the actual electric field in MQW structure 22, the profile of the electric field closely approximates a parabolic curve.

As is known, a change in the electric field in a multiquantum well structure is generally accompanied by a change in refractive index because of the so-called quantum-confined Stark effect.

Figure 11:
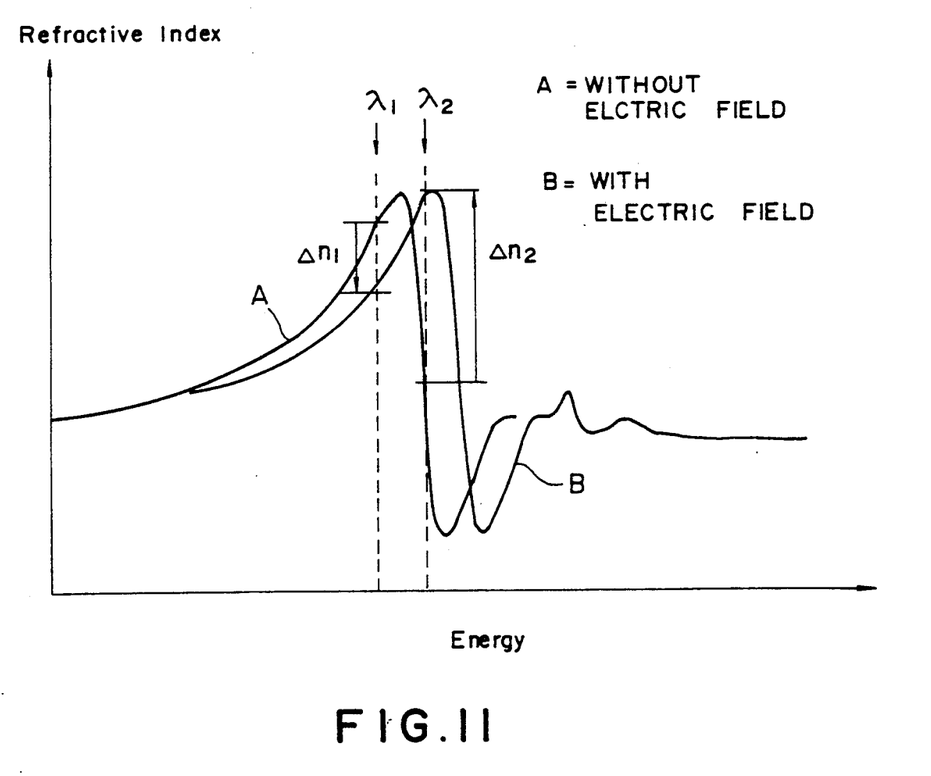
FIG. 11 is a graph schematically illustrating the changes in refractive index induced in response to the electric field of FIG. 10.

FIG. 11 is a diagram for explaining the quantum-confined Stark effect, wherein the refractive index of the multi-quantum well structure is represented as a function of the wavelength of the light incident upon the multi-quantum well structure. In FIG. 11, the curve designated by "A" represents the refractive index for a case where no electric field is applied to the structure and the curve designated by "B" represents the refractive index for a case where an electric field is applied. In the case where light having a wavelength $\lambda_1$ is incident upon the multi-quantum well structure, it will be seen from FIG. 11 that the refractive index is decreased by $\Delta n_1$ in response to the application of the electric field. In the case where light having a wavelength $\lambda_2$ is incident upon the structure, on the other hand, an increase $\Delta n_2$ occurs in the refractive index in response to the application of the electric field.

Thus, in response to the parabolic profile of the electric field in MQW structure 22, a corresponding parabolic profile of refractive index appears in the MQW structure 22 such that, in the case where an optical beam having a wavelength of about 1.5 $\mu$m is incident thereon, the refractive index is at its maximum at the center Ao and at its minimum at the marginal areas of the structure 22. Thus the device of the present embodiment operates as a convex lens.

Figure 12:
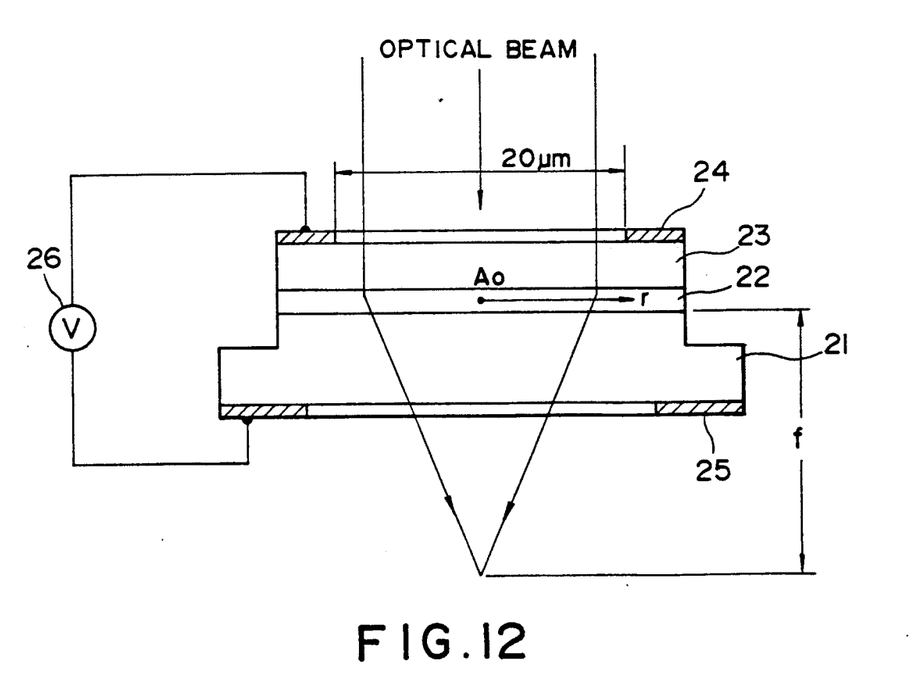
FIG. 12 is a cross-sectional view showing the focusing action of the semiconductor optical device of the embodiment of FIGS. 8A-8D.

In a semiconductor optical device having the foregoing dimensions, an optical beam having a wavelength of 1.5 $\mu$m is forced to a focal length f of 460 $\mu$m in response to the application of a bias voltage Vbias of 5 volts. When the device is constructed such that MQW structure 22 has a thickness of 2 $\mu$m and cap layer 23 has a thickness of 3 $\mu$m, the device provides a focal length f of 230 $\mu$m in response to a bias voltage of 5 volts. When no bias voltage Vbias is applied, the focal point of the semiconductor optical device is located at infinity. FIG. 12 shows the focusing action of the semiconductor optical device of the present embodiment. It will be noted that the bias voltage Vbias is supplied by the voltage source 26.

In the embodiment of FIGS. 8A–8D, carriers are not injected, and thus, there is no recombination of carriers. Thus, unwanted optical radiation created when recombination of carriers occurs is eliminated and the signal to noise ratio of the optical beam thus processed by the semiconductor optical device is significantly improved. Further, a wide variation of the focal length from infinity to less than 1 mm can be easily achieved by this embodiment.

Figure 13A:
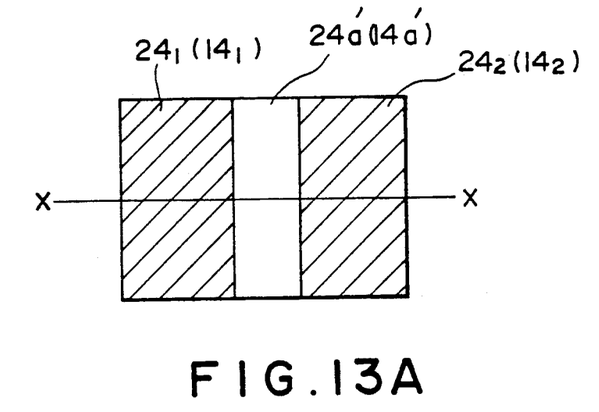
FIGS. 13A-13C are diagrams showing a modification of the first and second embodiments wherein the semiconductor optical device works as a cylindrical lens.
Figure 13B:
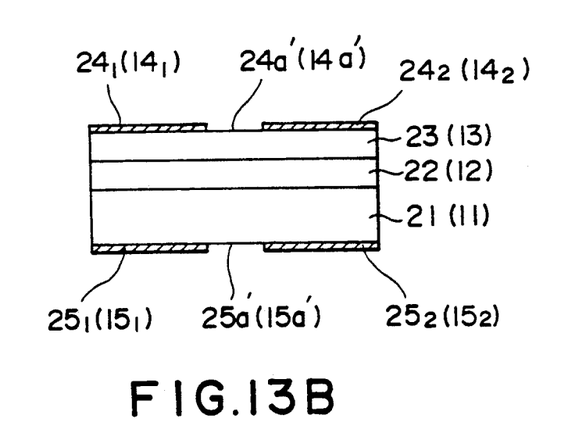
Figure 13C:
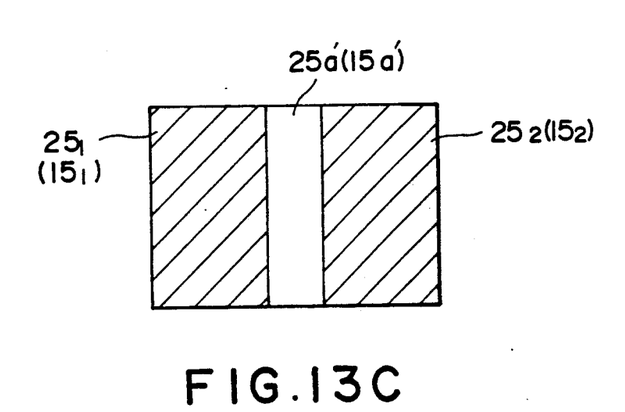

The shape of electrodes 24 and 25 is not limited to those described, but may as well comprise parallel electrodes with rectangular passage formed therebetween. FIGS. 13A–13C show such an example, wherein the electrode 24 is shown as comprising a first rectangular electrode part 24$_1$ and a second rectangular electrode part 24$_2$ with a rectangular passage 24$a'$ formed therebetween. Further, the electrode 25 is shown as comprising a first rectangular electrode part 25$_1$ and a second rectangular electrode part 25$_2$ with a rectangular passage 25$a'$ formed therebetween. Other parts of the device are substantially identical to the device of the second embodiment with the only difference being that all the layers 21–23 have a rectangular shape when viewed in the plan view. This device operates as a cylindrical lens. As the operation of this device is obvious from the foregoing description, further description thereof will be omitted.

Rectangular electrodes similar to those shown in FIGS. 13A–13C can also be provided on the device of the first embodiment which relies upon the injection of carriers. FIGS. 13A–13C also show such an example, wherein a pair of electrodes 14$_1$ and 14$_2$ define a rectangular passage 14$a'$ therebetween are provided on the top surface of the semiconductor layer 13. A pair of corresponding electrodes 15$_1$ and 15$_2$ are also provided on the bottom surface of the substrate 11 and a rectangular passage 15$a$ is formed between the electrode 15$_1$ and 15$_2$. The device thus operates as a cylindrical lens. As such a modification is obvious, further description will be omitted.

It should be noted that the device of FIG. 7 also operates as a lens when a reverse bias is applied across the electrodes 14 and 15. In this case, a refractive index profile which is symmetrical about the optical axis O is obtained similarly to the foregoing case by the Franz-Keldysh effect.

The semiconductor optical device of the present invention may be used effectively in the optical switching system of FIG. 1 by arranging the devices in a row and column formation.

Further, the present invention is not limited to these embodiments described heretofore but various variations and modifications may be made without departing from the scope of the invention.

What is claimed is:

1. A semiconductor optical device for focusing an optical beam, said device comprising:

a substrate doped to a first conductivity type and having a substantially flat upper major surface and a substantially flat lower major surface, said substrate surfaces being disposed in generally parallel relationship, said substrate being transparent to an incident optical beam supplied to the semiconductor optical device and capable of allowing said beam to pass therethrough;

a semiconductor layer doped to a second conductivity type different from said first conductivity type and having an substantially flat upper major surface and a substantially flat lower major surface, said semiconductor layer surfaces being disposed in generally parallel relationship, said lower surface of the semiconductor layer being disposed above the upper surface of the substrate in substantial parallelism therewith, said semiconductor layer being transparent to said incident optical beam and capable of allowing the optical beam to pass therethrough;

a recombination region formed between the lower surface of the substrate and the upper surface of the semiconductor layer, said recombination region being capable of receiving carriers from the substrate and from the semiconductor layer and causing a recombination of the carriers to occur within said region;

first electrode means provided on the lower surface of the substrate for injection carriers of a first type having a first polarity into the substrate, said first electrode means being capable of allowing the optical beam to pass therethrough; and second electrode means provided on the upper surface of the semiconductor layer for injection carriers of a second type having a second polarity opposite to said first polarity into the semiconductor layer, said second electrode means having an opening defined by an edge, said opening presenting a passageway for the optical beam, said semiconductor layer being formed from a material having a characteristic diffusion length for the second type carriers, said opening of the second electrode means having a size which is larger than the characteristic diffusion length of the second type carriers in the semiconductor layer, said second electrode being adapted to produce a refractive index profile in the recombination region upon application of a bias voltage, said profile being such that the refractive index in said region is at a minimum at the center of the opening and at a maximum at said edge of the opening.

2. A semiconductor optical device as set forth in claim 1, wherein a first anti-reflection means is provided on the lower major surface of the substrate for facilitating the passage of the optical beam through the substrate, and a second anti-reflection means is provided on the semiconductor layer at the passageway in the second electrode means for facilitating the passage of the optical beam therethrough.

3. A semiconductor optical device as set forth in claim 1, wherein said first electrode means comprises a ring-shaped electrode defining an opening permitting passage of the optical beam, said opening of the first electrode means being in alignment with the opening of the second electrode means.

4. A semiconductor optical device as set forth in claim 1, wherein said substrate and said semiconductor layer have respective characteristic band gaps, and said recombination region comprises a semiconductor material having a characteristic band gap which is substantially smaller than the band gap of either the substrate or the semiconductor layer.

5. A semiconductor optical device as set forth in claim 4, wherein the semiconductor material of said region is doped to the first conductivity type.

6. A semiconductor optical device as set forth in claim 4, wherein the semiconductor material of said region is doped to the second conductivity type.

7. A semiconductor optical device as set forth in claim 4, wherein the semiconductor material of said region is undoped.

8. A semiconductor optical device as set forth in claim 1, wherein said upper surface of the substrate and said lower surface of the semiconductor layer are in contact with each other presenting an interface therebetween, said interface defining said recombination region.

9. A semiconductor optical device for focusing an optical beam, said device comprising:
a substrate having a substantially flat upper major surface and a substantially flat lower major surface, said substrate surfaces being disposed in generally parallel relationship, said substrate being transparent to an incident optical beam supplied to the semiconductor optical device and capable of allowing the optical beam to pass therethrough;

a quantum well structure provided on the upper major surface of the substrate, said quantum well structure comprising a pair of confinement layers and a first semiconductor layer sandwiched between the confinement layers, said semiconductor layer having a characteristic band gap and upper and lower major surfaces, said confinement layers each having upper and lower major surfaces which are substantially parallel to the upper and lower major surfaces of the semiconductor layer and each of said confinement layers having a characteristic band gap which is larger than the band gap of the semiconductor layer, said semiconductor layer having a reduced thickness such that a quantum well is formed therein, said quantum well structure having an upper major surface which is substantially parallel to the upper major surface of the substrate;

a cap layer provided on the upper major surface of the quantum well structure, said cap layer having a top surface;

first electrode means provided on the lower major surface of the substrate for applying an electric field to the substrate; and second electrode means provided on said top surface of the cap layer for applying said electric field in cooperation with the first electrode means, said first electrode means being configured to allow passage of the optical beam therethrough, said second electrode means being provided with an opening defined by an edge configured to allow the optical beam to pass therethrough, said second electrode means being supplied with a bias voltage for inducing a non-uniform profile in the electric field so that a non-uniform refraction index profile is formed in the quantum well structure, said profile being such that the refractive index is at a minimum at the center of the opening and at a maximum at said edge of the opening, said second electrode means being capable of modifying the refractive index profile in response to changes in the bias voltage.

10. A semiconductor optical device as set forth in claim 9, wherein said cap layer comprises an undoped semiconductor layer.

11. A semiconductor optical device as set forth in claim 1, wherein said second electrode means comprises first and second electrode pieces separated from each other to present a gap therebetween, said gap defining said opening in the second electrode means and having a dimension which is larger than the diffusion length of the second type carriers in the semiconductor layer.

12. A semiconductor optical device as claimed in claim 9, wherein said second electrode means comprises first and second electrode pieces separated from each to present a gap therebetween, said gap defining said opening in the second electrode means and having a size to cause the non-uniform profile in the electric field.

13. A semiconductor optical device for focusing an optical beam, said device comprising:
a substrate having a substantially flat upper major surface and a substantially flat lower major surface, said substrate surfaces being disposed in generally parallel relationship, said substrate being transparent to an incident optical beam supplied to the semiconductor optical device and capable of allowing the optical beam to pass therethrough;

a quantum well structure provided on the upper major surface of the substrate, said quantum well structure comprising a plurality of confinement layers and a plurality of first semiconductor layers, said semiconductor layers being sandwiched between respective pairs of confinement layers, said semiconductor layers each having a characteristic band gap and upper and lower major surfaces, said confinement layers each having upper and lower major surfaces which are substantially parallel to the upper and lower major surfaces of the semiconductor layers and each of the confinement layers of each of said pairs thereof having a characteristic band gap which is larger than the band gap of the semiconductor layer sandwiched therebetween, said semiconductor layers having a reduced thickness such that a quantum well is formed therein, said quantum well structure having an upper major surface which is substantially parallel to the upper major surface of the substrate;

a cap layer provided on the upper major surface of the quantum well structure, said cap layer having a top surface;

first electrode means provided on the lower major surface of the substrate for applying an electric field to the substrate; and second electrode means provided on said top surface of the cap layer for applying said electric field in cooperation with the first electrode means, said first electrode means being configured to allow passage of the optical beam therethrough, said second electrode means being provided with an opening defined by an edge configured to allow the optical beam to pass therethrough, said second electrode means being supplied with a bias voltage for inducing a non-uniform profile in the electric field so that a non-uniform refraction index profile is formed in the quantum well structure, said profile being such that the refractive index is at a minimum at the center of the opening and at a maximum at said edge of the opening, said second electrode means being capable of modifying the refractive index profile in response to changes in the bias voltage.

* * * * *

UNITED STATES PATENT AND TRADEMARK OFFICE
CERTIFICATE OF CORRECTION

PATENT NO. : 5,126,875
DATED : June 30, 1992
INVENTOR(S) : HARUHIKO TABUCHI

It is certified that error appears in the above-identified patent and that said Letters Patent is hereby corrected as shown below:

Column 5, line 60, before "from" insert --distance--.

Column 7, line 61, after "A" insert --. A--.

Column 8, line 25, "a" should be --an--.

Column 9, line 53, "241" should be --24$_1$--.

Signed and Sealed this

Nineteenth Day of October, 1993

Attest:

BRUCE LEHMAN

Attesting Officer

Commissioner of Patents and Trademarks